US012640833B2

(12) United States Patent
Meisler et al.

(10) Patent No.: US 12,640,833 B2
(45) Date of Patent: May 26, 2026

(54) COMMUNICATIONS SYSTEM TO ADJUST A SIGNAL SCRAMBLER

(71) Applicant: Intel Corporation, Santa Clara, CA (US)

(72) Inventors: Alon Meisler, Haifa (IL); Ehud Shoor, Haifa (IL); Amir Mezer, Haifa (IL); Tsion Vidal, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/869,370

(22) Filed: Jul. 20, 2022

(65) Prior Publication Data

US 2022/0360359 A1 Nov. 10, 2022

(51) Int. Cl.
*H04K 1/04* (2006.01)

(52) U.S. Cl.
CPC ...................................... *H04K 1/04* (2013.01)

(58) Field of Classification Search
None
See application file for complete search history.

(56) References Cited

U.S. PATENT DOCUMENTS

| | | | | |
|---|---|---|---|---|
| 2001/0048714 A1* | 12/2001 | Jha | H04B 1/708 | 375/150 |
| 2008/0215893 A1* | 9/2008 | Bliss | H04K 1/00 | 713/189 |
| 2021/0385169 A1* | 12/2021 | Urman | H04L 1/08 | |

OTHER PUBLICATIONS

Intel® Cyclone® 10 GX Transceiver PHY User Guide, Version: May 15, 2020, https://www.intel.com/content/www/us/en/docs/programmable/683054/20-1/scrambler.html, 5. Cyclone 10 GX Transceiver PHY Architecture, 5.2.1.6 "Scrambler", Jul. 7, 2022, p. 290.

Mandin, Jeff, "Scrambling in 10G Ethernet and applicability to 10G EPON", https://grouper.ieee.org/groups/802/3/av/public/2006_11/3av_0611_mandin_1.pdf, 802.3av Task Force—Dallas, Nov. 2006, 10 pages.

* cited by examiner

*Primary Examiner* — William J. Goodchild
(74) *Attorney, Agent, or Firm* — Compass IP Law PC

(57) ABSTRACT

Examples described herein relate to a network interface device that includes first circuitry to perform a first scrambling operation on input data; second circuitry to perform a second scrambling operation on the input data; and third circuitry to select the second scrambled input data based on the first scrambled input data including a data sequence that is associated with receiver malfunction and the second scrambled input data including the data sequence that is associated with receiver malfunction.

21 Claims, 8 Drawing Sheets

COMMUNICATIONS SYSTEM TO ADJUST A SIGNAL SCRAMBLER

BACKGROUND

In communications systems, the volume of transmitted data is ever-expanding. Errors can arise in transmitted data, which can lead to malfunctioning of receiver of the data. For example, military systems, autonomous driving systems, compressed video and other systems utilize transmitted data and can malfunction, sometimes catastrophically as a result of errors in data. Metrics used to define reliability of data include Bit Error Rate (BER).

Some known phenomena jeopardize ability to meet reliability levels. For example, rare yet impactful jeopardizing data streams may cause loss of Clock-and-Data-Recovery (CDR) lock or clipping of the received signal. Such data streams can impact the overall bit error rate due to a potentially long time needed for the receiver to recover (relock). Some data sequences may cause a far end system to fail in its physical layer interface (PHY) or physical coding sublayer (PCS) processor. Example data streams include transition-sparse data streams with repeated values.

One example data stream includes long run-lengths of 0's or 1's, which may cause the adaptive mechanisms or CDR mechanisms to suffer from starvation, or insufficient data for adaptation and tracking, which may result in an error at the receiver output. Another phenomenon that can result from instantaneous implanting is the build-up of baseline wander (BLW), which can shift the common mode of the signal and closing of a signal's "eye" pattern (e.g., transitions of zero values to one values and one values to zero values). In addition, there might be scenarios exposed to malicious attacks in which a specific data pattern is driven through a link to cause failure of a receiver.

Use of a scrambler and error correction code generation and insertion at transmitter and descrambler and error correction code check at a receiver can reduce a likelihood that a data stream can cause a receiver to malfunction.

DETAILED DESCRIPTION

At least to attempt to reduce a likelihood that a data stream causes malfunction of a receiver, multiple scramblers and at least one application of error correction codes at a transmitter and multiple de-scramblers and error code check at a receiver can be utilized. If a probability of a jeopardizing data stream that can cause a receiver to malfunction for a single scrambler is P (e.g., $10^{-15}$), then for use of an integer number N scramblers, the probability that N scramblers output jeopardizing data streams is $P^N$ (e.g., $10^{-15*N}$). A probability of a receiver receiving a jeopardizing data stream can be adjusted by selecting a value of N number of scramblers available to scramble data, where the N scramblers use different scrambling schemes or apply scrambling in series (e.g., a scrambled data stream is scrambled by at least one other scrambler). Integrity of data transmitted between servers and sensitive systems can be improved by use of N data scramblers and potentially error coding. Example uses can be in at least military systems, autonomous driving systems, banking systems, block chains and compressed video.

Figure 1:
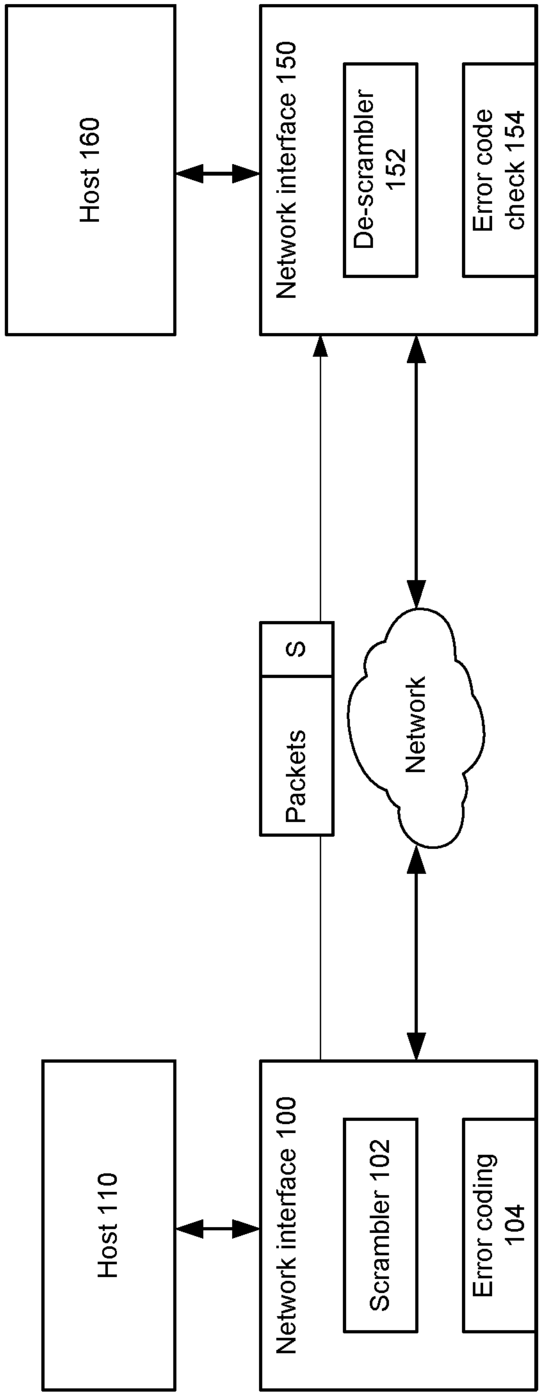
FIG. 1 depicts an example system.

FIG. 1 depicts an example system. First host system 110 can request first network interface 100 to transmit one or more packets to second network interface device 150 connected to second host system 160. Various examples of first host system 100 and second host system 160 are described at least with respect to FIG. 6 or 7. First network interface device 110 and second network interface device 150 can include one or more circuitry and software at least of network interface device described with respect to FIG. 5, 6, or 7.

In some examples, first network interface device 100 can include scrambler circuitry 102 to perform N scrambler operations on packet contents. Packet contents can include packet header, payload, or header and payload. In some examples, scrambler circuitry 102 can be part of a media access control (MAC) encoder, physical layer interface (PHY), or physical coding sublayer (PCS) processor of network interface device 100. In some examples, scrambler circuitry 102 can be part of a direct memory access (DMA) circuitry used to copy data from host 110 to network interface device or circuitry or processor-executed software or firmware in host 110. In some examples, scrambler circuitry 102 can be implemented as one or more of: one or more application specific integrated circuits (ASICs); one or more field programmable gate arrays (FPGAs); firmware executed by a processor; software executed by a processor; or other circuitry.

In some examples, scrambler circuitry 102 or other circuitry in MAC encoder, PHY, or PCS processor can transform data. For example, pre-scrambled data or scrambled data can be transformed from 64-bit to 66-bit (64b/66b), 64-bit to 67-bit (64b/67b Interlaken encoding), 128-bit to 130-bit (128b/130b), 256-bit to 258-bit (256b/258b), 512-bit to 514-bit (512b/514b), or others.

First network interface device 100 can apply error coding 104 to portions of the packet prior to transmission such as forward error correction (FEC), checksum, cyclic redundancy check (CRC). First network interface device 100 can insert the generated error code into the packet prior to transmission to second network interface device 150. First network interface device 100 can apply signal modulation of transmitted signals can be in accordance with one or more of: Pulse Amplitude Modulation (PAM) 2, PAM 4, Non-Return-to-Zero (NRZ), or others.

Scrambler circuitry 102 can accumulate data for scrambling by N different scramblers running in parallel such that N candidate packets are prepared for transmission. For example, parallel can include N different scramblers generating scrambled output data at a same time for at least an instance in time. In some examples, scrambler circuitry 102 can scramble data by N different scramblers running in series such as a first scrambler of the N scramblers scrambles data, a second scrambler of the N scramblers scrambles the scrambled data from the first scrambler, and so forth. The first and second scramblers can apply the same or different scrambling operations. Scrambler circuitry 102 can scan candidates to determine a candidate scrambled data that does not include a data pattern of zeros and/or ones that cause or are associated with malfunction of a receiver. For example, scrambler circuitry 102 can access a data structure with one or more data patterns of zeros and/or ones that cause or are associated with malfunction of a receiver. A data pattern of zeros and/or ones that cause or are associated with malfunction of a receiver can include a run-length of zeros and/or ones that caused the receiver to malfunction (e.g., DC imbalancing, loss of CDR lock, malfunction as part of link establishment).

In some examples, data patterns associated with loss of frequency lock can be identified from failure of a CDR of second network interface device 150. Example data patterns or sequences associated with a string of 1s or 0s longer than 100 in a row can be associated with receiver malfunction. In such case, less than 100 symbols (e.g., 50 symbols) with the same polarity (1s or 0s) can be used to identify a pattern associated with receiver malfunction. Other numbers of consecutive 1s or 0s can correspond to data patterns associated with malfunction of a receiver.

In some examples, scrambler circuitry 102 can apply linear-feedback shift register (LFSR) to a sequence of bits of a payload. Scrambler circuitry 102 can apply N scramblers by using N different scrambler polynomials and/or N different seeds of a same polynomial. For some applications, selecting N=2 can provide error probability that can be practically considered as zero.

Scrambler circuitry 102 can cause an indicator (S), of a selected scrambler or number of scramblers in series utilized to scramble data, to be inserted into log 2(N) bits in the header of one or more transmitted packets or within an error coding field (e.g., FEC block code or Reed-Solomon based block code). For example, if there are four scramblers that scramble data in series and such scrambled output data is transmitted to second network interface device 150, the value S can be set to 3. Second network interface device 150 can utilize the indicator of selected scrambler or number of scramblers used to de-scramble the one or more packets. In a case of FEC encoded links that employ block codes (e.g., Reed-Solomon), the scrambling information (S) may be extracted at the receiver without adding latency as the receiver accesses the block for FEC decoding. In some examples, first network interface device 100 and second network interface device 150 so that use of a particular S value specifies a corresponding scrambler and de-scrambler pair. For example, an administrator or hypervisor can configure both first network interface device 100 and second network interface device 150 to apply scrambler and de-scrambler pairs for particular S values.

First network interface device 100 can communicate with second network interface device 150 using various protocols such as those listed herein and at least Ethernet, Peripheral Component Interconnect (PCI) Express, Universal Serial Bus (USB) 3.1, DisplayPort 2.0, Compute Express Link (CXL), Universal Chiplet Interconnect Express (UCIe), and others.

Second network interface device 150 can include de-scrambler circuitry 152 to de-scramble one or more received packets based on scrambling information (S). De-scrambler circuitry 152 can perform de-scrambling operation that is an inverse of scrambling operations performed by first network interface device 100. In some examples, de-scrambler circuitry 152 can be part of a MAC decoder, forward error correction (FEC), PHY, or PCS processor.

Second network interface device 150 can apply error decoding to portions of the received one or more packets prior to transmission such as (FEC), checksum, cyclic redundancy check (CRC).

While the example shows first network interface device 100 transmitting packets to second network interface device 150, similar technologies can be utilized by second network interface device 150 to scramble packet contents prior to transmission to first network interface device 100 and first network interface device 100 can de-scramble contents of packets as described herein.

Figure 2:
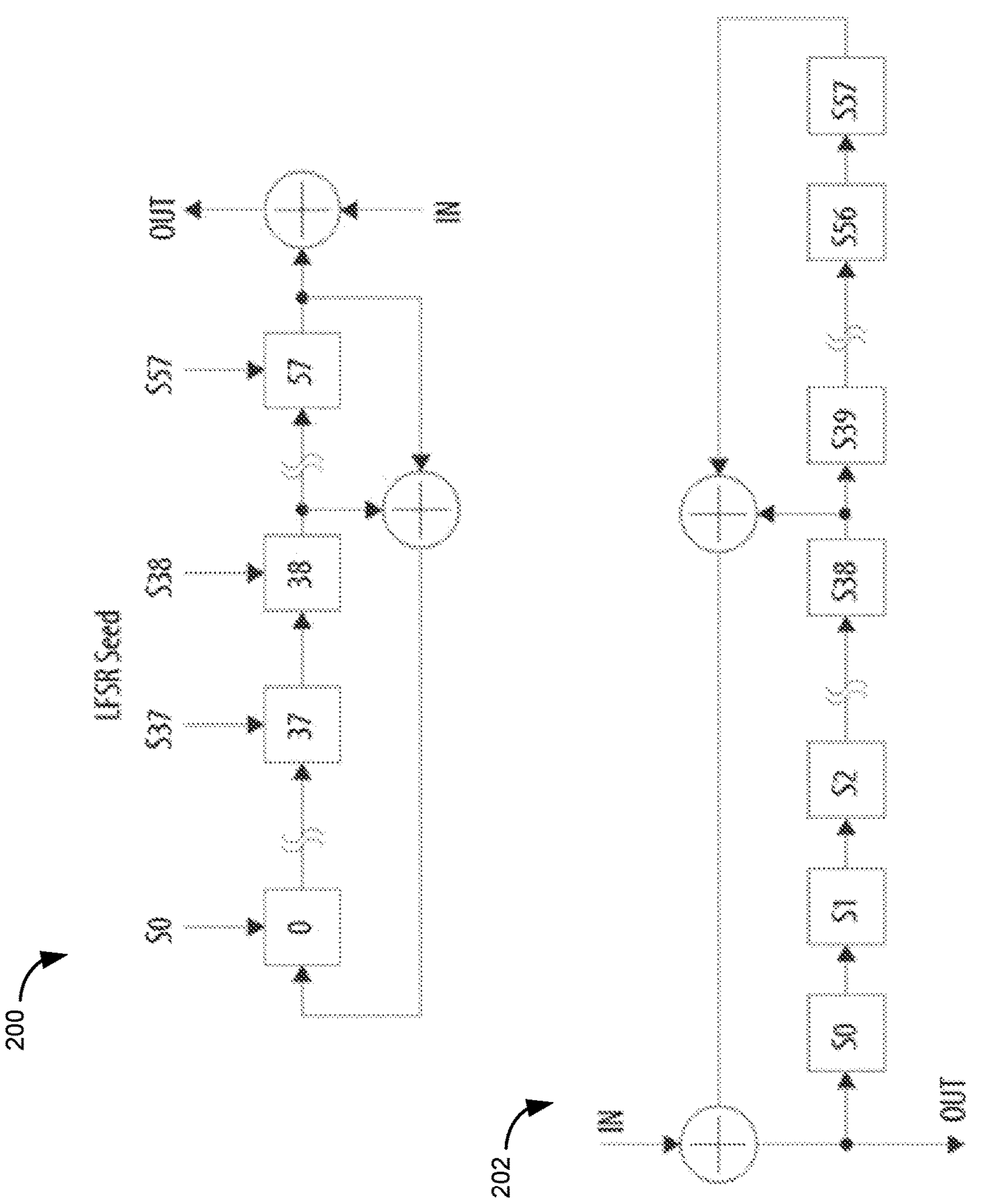
FIG. 2 depicts an example of operations of scramblers.

FIG. 2 depicts an example of operations of scramblers. Scrambling can attempt to reduce correlation between the symbols sent through the physical channel. Synchronous (or additive) scrambler 200 can generate scrambled data by adding a pseudo-random sequence to the data sequence. In some cases, the pseudo-random sequence is generated using Linear Feedback Shift Register (LFSR). Asynchronous (or self-synchronizing) scrambler 202 can generate a scrambled sequence by feeding the input into an LFSR in a recursive manner. Other scrambler operations can be performed.

Figure 3A:
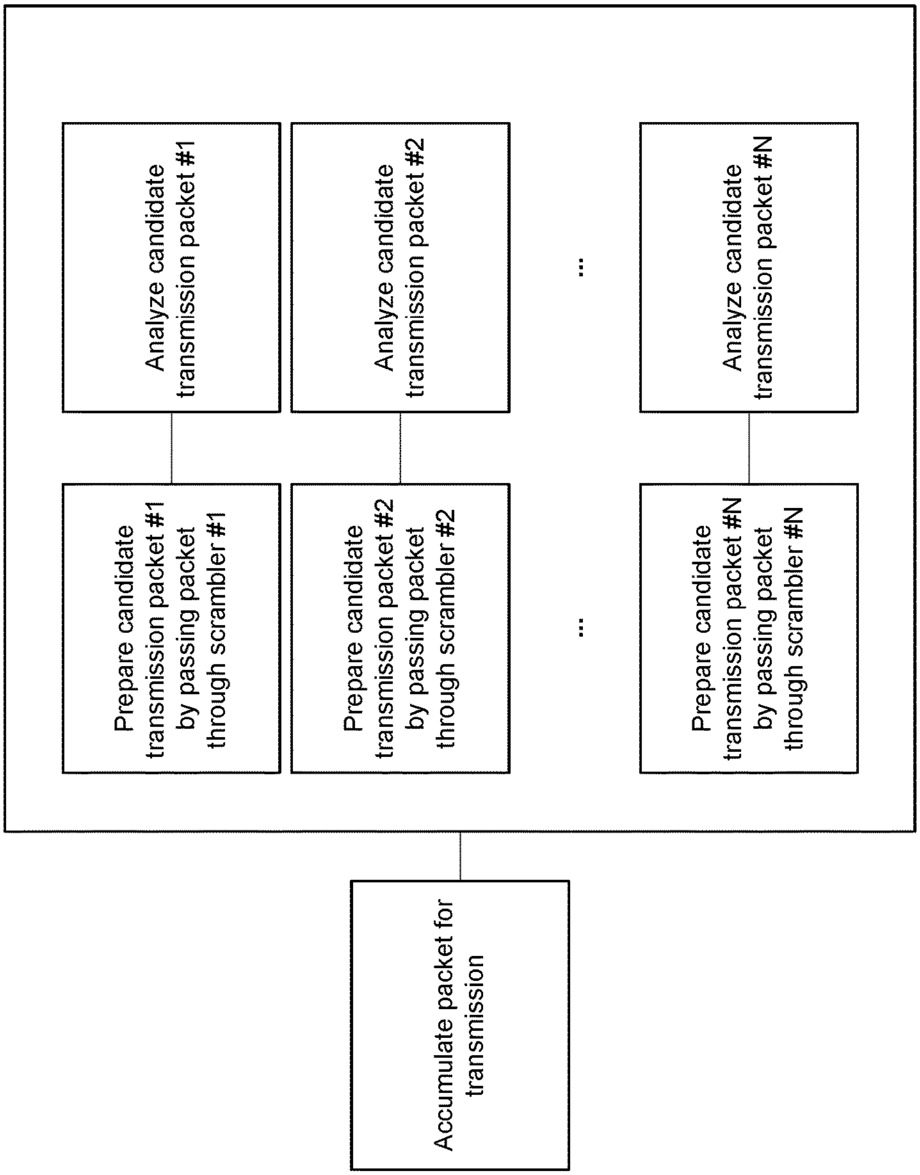
FIG. 3A depicts an example manner of processing a packet for transmission.
Figure 3B:
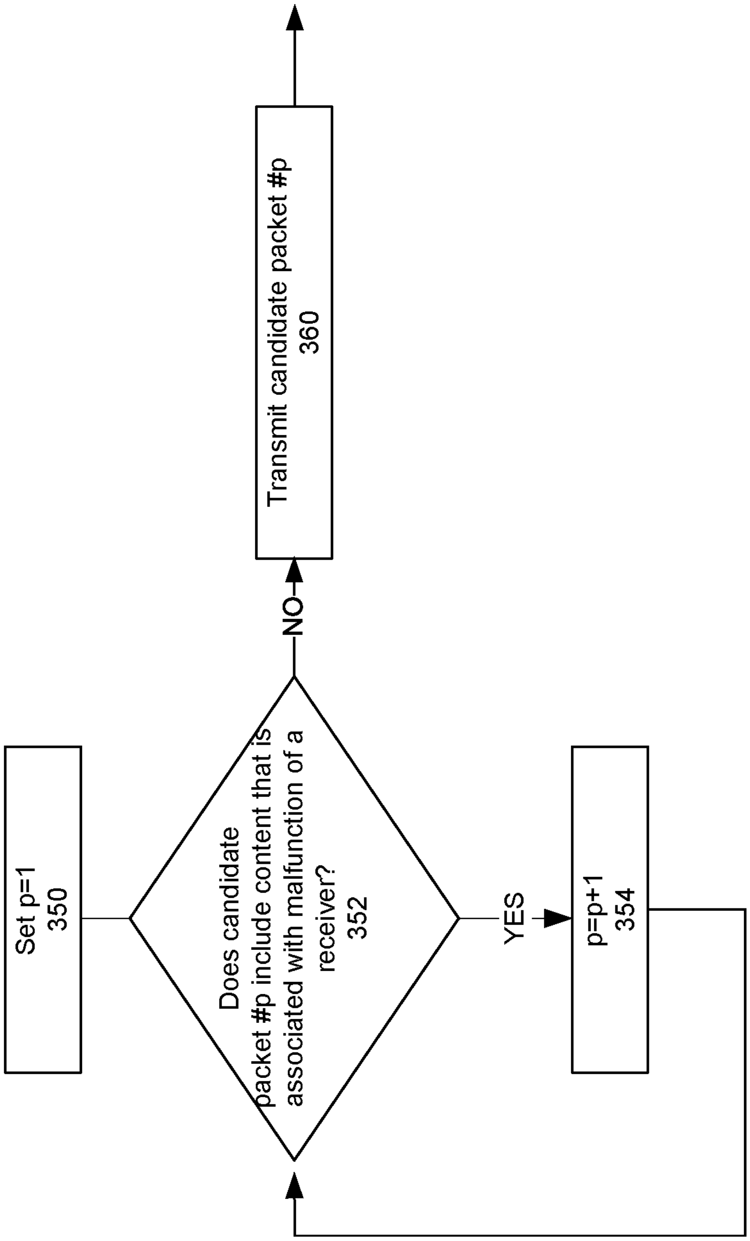
FIG. 3B depicts an example of selecting a scrambler output.

FIG. 3A depicts an example manner of processing a packet for transmission. The process can apply N parallel scramblers to a packet to determine N candidate packets. As shown in FIG. 3B, based on a determination a scrambled packet includes a data sequence that can cause or is associated with malfunction of a receiver (352), at 354 another of the N scrambled data or packets can be selected for transmission. For example, an index p (where p≥N) can be used to identify a selected scrambler that scrambled data or packet prior to transmission (360).

Figure 4:
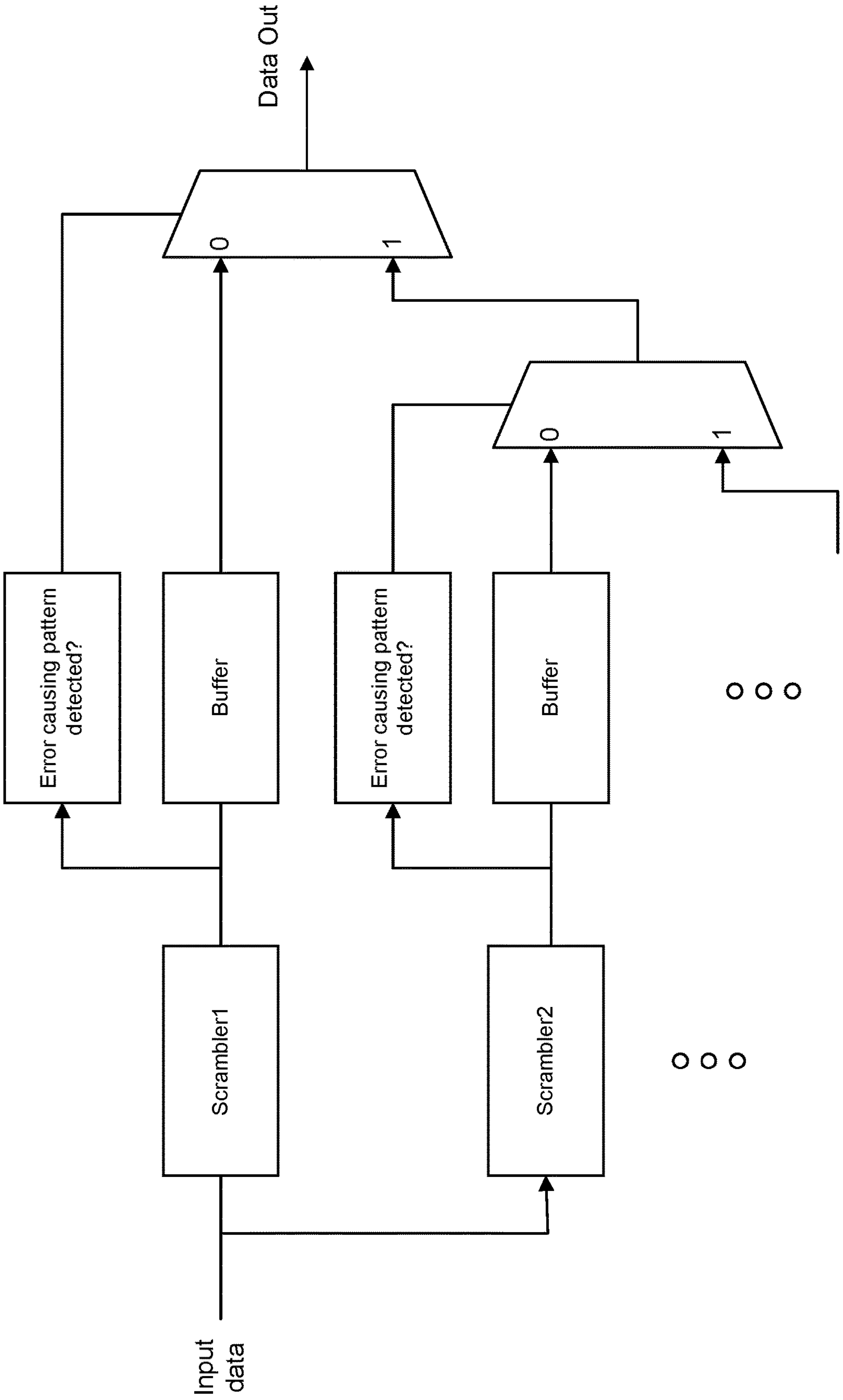
FIG. 4 depicts an example logical flow of a preparing a packet for transmission.

FIG. 4 depicts an example logical flow of a preparing a packet for transmission. For example, scrambler #1 can be applied to input data. In parallel, additional N−1 scrambler candidates may be used to scramble input data using different scrambler techniques to generate different scrambled data. Scrambled data from N scramblers can be buffered. Candidates can be checked in parallel and the selected scrambler output used for transmission. If the scrambled data from scrambler #1 does not include a pattern or sequence of data bits that is associated with malfunction of a receiver, data from scrambler #1 can be transmitted. If the scrambled data from scrambler #1 includes a pattern or sequence of data bits that is associated with malfunction of a receiver and if scrambled data from scrambler #2 does not include a pattern or sequence of data bits that is associated with malfunction of a receiver, data from scrambler #2 can be transmitted. Similar logic can be utilized for N scrambler outputs.

Figure 5:
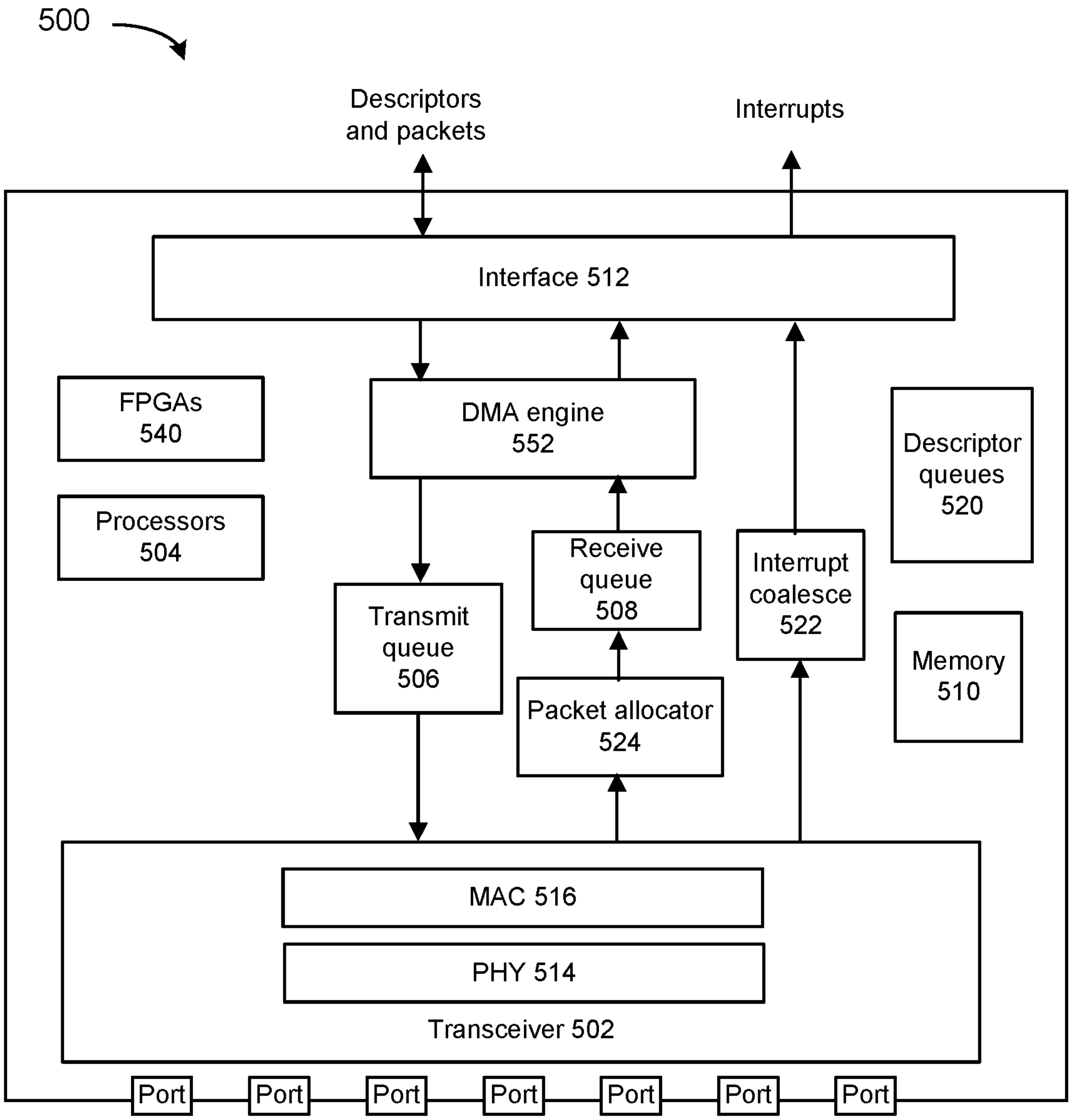
FIG. 5 depicts an example network interface device.

FIG. 5 depicts an example network interface device. In some examples, processors 904 and/or FPGAs 540 can be configured to perform selection of a scrambler, identification of a selected scrambler, or de-scrambling, as described herein. Some examples of network interface 500 are part of an Infrastructure Processing Unit (IPU) or data processing unit (DPU) or utilized by an IPU or DPU. An XPU or xPU can refer at least to an IPU, DPU, graphics processing unit (GPU), general purpose GPU (GPGPU), or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 500 can include transceiver 502, processors 504, transmit queue 506, receive queue 508, memory 510, and bus interface 512, and DMA engine 552. Transceiver 502 can be capable of receiving and transmitting packets in conformance with the applicable protocols such as Ethernet as described in IEEE 802.3, although other protocols may be used. Transceiver 502 can receive and transmit packets from and to a network via a network medium (not depicted). Transceiver 502 can include PHY circuitry 514 and media access control (MAC) circuitry 516. PHY circuitry 514 can include encoding and decoding circuitry (not shown) to encode and decode data packets according to applicable physical layer specifications or standards. MAC circuitry 516 can be configured to perform MAC address filtering on received packets, process MAC headers of received packets by verifying data integrity, remove preambles and padding, and provide packet content for processing by higher layers. MAC circuitry 516 can be configured to assemble data to be transmitted into packets, that include destination and source addresses along with network control information and error detection hash values.

Processors 504 can be one or more of: combination of: a processor, core, graphics processing unit (GPU), field programmable gate array (FPGA), application specific integrated circuit (ASIC), or other programmable hardware device that allow programming of network interface 500. For example, a "smart network interface" or SmartNIC can provide packet processing capabilities in the network interface using processors 504.

Processors 504 can include a programmable processing pipeline that is programmable by Programming Protocol-independent Packet Processors (P4), Software for Open Networking in the Cloud (SONiC), C, Python, Broadcom Network Programming Language (NPL), NVIDIA® CUDA®, NVIDIA® DOCA™, Infrastructure Programmer Development Kit (IPDK), or x86 compatible executable binaries or other executable binaries. A programmable processing pipeline can include one or more match-action units (MAUs) that can schedule packets for transmission using one or multiple granularity lists, as described herein. Processors, FPGAs, other specialized processors, controllers, devices, and/or circuits can be used utilized for packet processing or packet modification. Ternary content-addressable memory (TCAM) can be used for parallel match-action or look-up operations on packet header content. Processors 504 and/or FPGAs 540 can be configured to perform event detection and action.

Packet allocator 524 can provide distribution of received packets for processing by multiple CPUs or cores using receive side scaling (RSS). When packet allocator 524 uses RSS, packet allocator 524 can calculate a hash or make another determination based on contents of a received packet to determine which CPU or core is to process a packet.

Interrupt coalesce 522 can perform interrupt moderation whereby network interface interrupt coalesce 522 waits for multiple packets to arrive, or for a time-out to expire, before generating an interrupt to host system to process received packet(s). Receive Segment Coalescing (RSC) can be performed by network interface 500 whereby portions of incoming packets are combined into segments of a packet. Network interface 500 provides this coalesced packet to an application.

Direct memory access (DMA) engine 552 can copy a packet header, packet payload, and/or descriptor directly from host memory to the network interface or vice versa, instead of copying the packet to an intermediate buffer at the host and then using another copy operation from the intermediate buffer to the destination buffer.

Memory 510 can be any type of volatile or non-volatile memory device and can store any queue or instructions used to program network interface 500. Transmit traffic manager can schedule transmission of packets from transmit queue 506. Transmit queue 506 can include data or references to data for transmission by network interface. Receive queue 508 can include data or references to data that was received by network interface from a network. Descriptor queues 520 can include descriptors that reference data or packets in transmit queue 506 or receive queue 508. Bus interface 512 can provide an interface with host device (not depicted). For example, bus interface 512 can be compatible with or based at least in part on PCI, PCIe, PCI-x, Serial ATA, and/or USB (although other interconnection standards may be used), or proprietary variations thereof.

Figure 6:
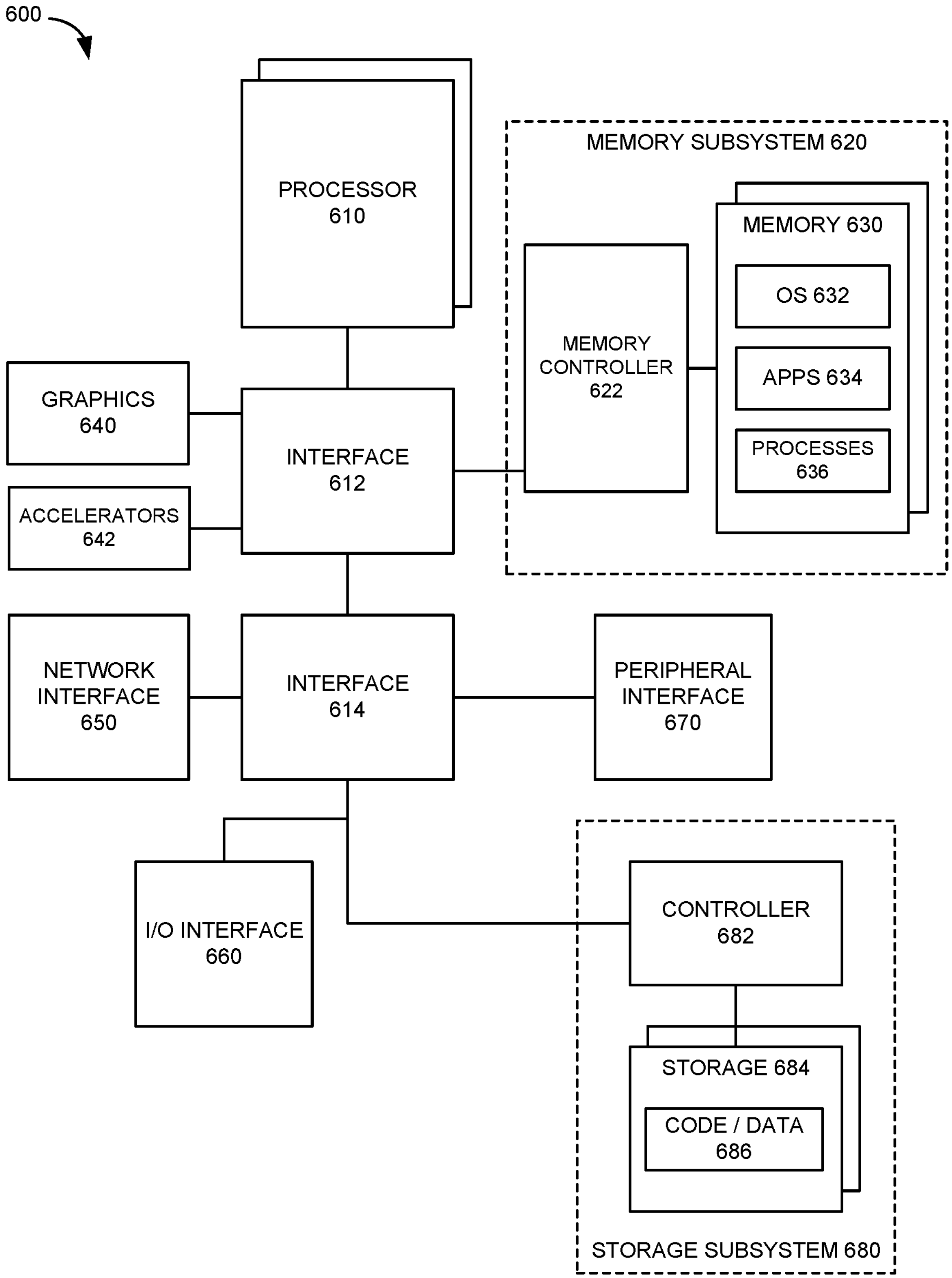
FIG. 6 depicts an example system.

FIG. 6 depicts an example system. Components of system 600 (e.g., processor 610, graphics 640, accelerators 642, memory 630, storage 684, network interface 650, and so forth) can be utilized to perform selection of a scrambler, identification of a selected scrambler, or de-scrambling. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function or programmable offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 642 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) express bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory.

In some examples, network interface device 650 can refer to one or more of: a network interface controller (NIC), a remote direct memory access (RDMA)-enabled NIC, SmartNIC, router, switch, forwarding element, infrastructure processing unit (IPU), data processing unit (DPU), or network-attached appliance. Some examples of network interface 650 are part of an Infrastructure Processing Unit (IPU) or data processing unit (DPU) or utilized by an IPU or DPU. An XPU or xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. A programmable pipeline can be programmed using one or more of: P4, SONiC, C, Python, Broadcom Network Programming Language (NPL), NVIDIA® CUDA®, NVIDIA® DOCA™, Infrastructure Programmer Development Kit (IPDK), or x86 compatible executable binaries or other executable binaries.

In some examples, OS 632 or a driver for network interface device 650 can configure network interface 650 to perform selection of a scrambler, identification of a selected scrambler, or de-scrambling.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as those consistent with specifications from JEDEC (Joint Electronic Device Engineering Council) or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), a combination of one or more of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects or device interfaces can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), Universal Chiplet Interconnect Express (UCIe), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., Non-Volatile Memory Express (NVMe) Specification, revision 1.3c, published on May 24, 2018 or earlier or later versions, or revisions thereof).

Communications between devices can take place using a network that provides die-to-die communications; chip-to-chip communications; circuit board-to-circuit board communications; and/or package-to-package communications. A die-to-die communications can be consistent with Embedded Multi-Die Interconnect Bridge (EMIB) or utilize an interposer.

Figure 7:
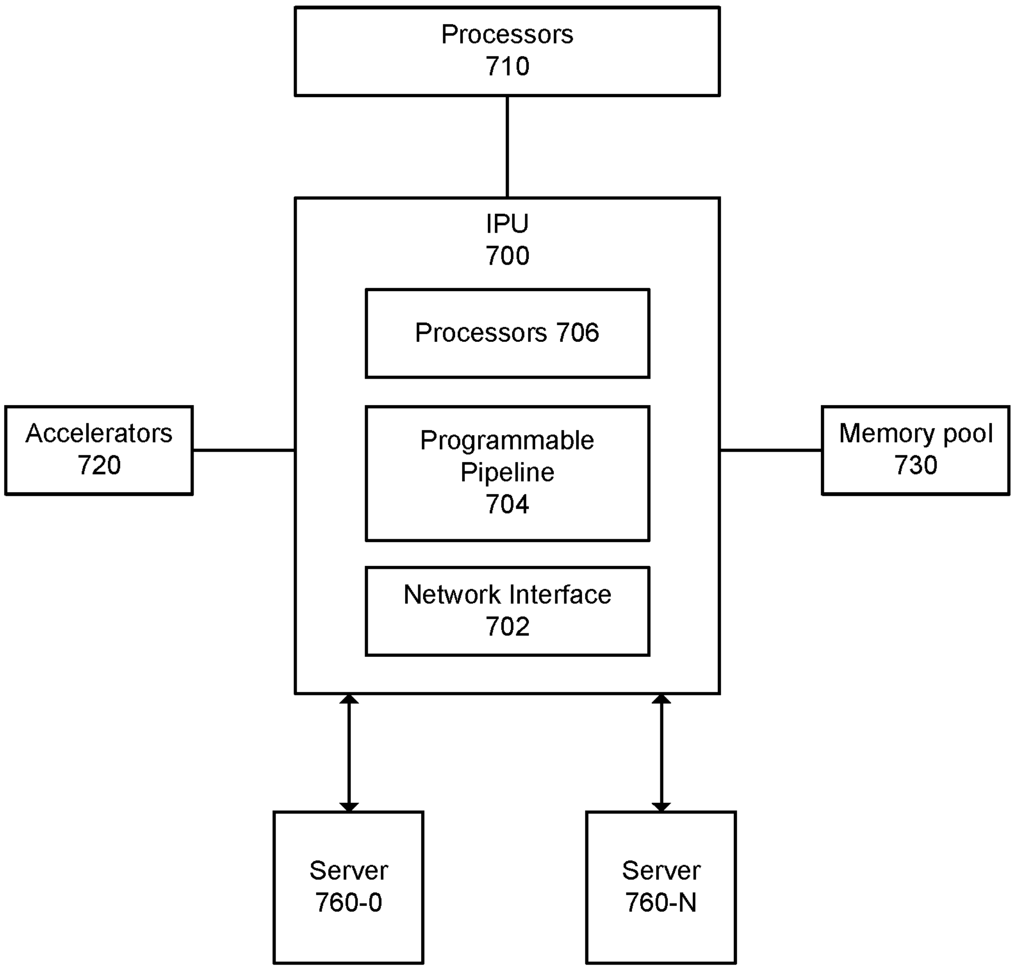
FIG. 7 depicts an example system.

FIG. 7 depicts an example system. In this system, IPU 700 manages performance of one or more processes using one or more of processors 706, processors 710, accelerators 720, memory pool 730, or servers 740-0 to 740-N, where N is an integer of 1 or more. In some examples, processors 706 of IPU 700 can execute one or more processes, applications, VMs, containers, microservices, and so forth that request performance of workloads by one or more of: processors 710, accelerators 720, memory pool 730, and/or servers 740-0 to 740-N. IPU 700 can utilize network interface 702 or one or more device interfaces to communicate with processors 710, accelerators 720, memory pool 730, and/or servers 740-0 to 740-N. IPU 700 can utilize programmable pipeline 704 to process packets that are to be transmitted from network interface 702 or packets received from network interface 702. Programmable pipeline 704 and/or processors 706 can be configured to perform selection of a scrambler, identification of a selected scrambler, or de-scrambling.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising: first circuitry to perform a first scrambling operation on input data to generate first scrambled output data; second circuitry to perform a second scrambling operation on the input data to generate second scrambled output data; and third circuitry to select the second scrambled output data based on the first scrambled output data including a data sequence that is associated with receiver malfunction and the second scrambled output data not including the data sequence that is associated with receiver malfunction.

Example 2 includes one or more examples, wherein the first circuitry and second circuitry are to perform respective first and second scrambling operations at least partially in parallel.

Example 3 includes one or more examples, wherein the data sequence that is associated with receiver malfunction comprises a string of repeated values.

Example 4 includes one or more examples, and includes a fourth circuitry to identify the selected second scrambler used to scramble the input data in at least one packet that includes the second scrambled output data.

Example 5 includes one or more examples, wherein the network interface device comprises a media access control (MAC) circuitry and wherein the MAC circuitry includes the first circuitry and the second circuitry.

Example 6 includes one or more examples, wherein the network interface device comprises a processor to perform error coding on the selected scrambled second output data.

Example 7 includes one or more examples, wherein the first scrambling operation and the second scrambling operation provide different scrambled output data.

Example 8 includes one or more examples, wherein the first scrambling operation comprises an additive scrambling operation and the second scrambling operation comprises an asynchronous scrambling operation.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

Example 10 includes one or more examples, and include a server communicatively coupled to the network interface device, wherein the server is to generate the input data for transmission.

Example 11 includes one or more examples, and includes a second network interface device, wherein the second network interface device comprises at least one de-scrambler to de-scramble the scrambled output data based on an indicator of selected scrambler.

Example 12 includes one or more examples, and includes a non-transitory computer-readable medium comprising instructions stored thereon, that if executed by one or more processors, cause the one or more processors to: configure a network interface device to: perform a first scrambling operation on input data to generate first scrambled output data; perform a second scrambling operation on the input data to generate second scrambled output data; and select the second scrambled input data based on the first scrambled output data including a data sequence that is associated with receiver malfunction and the second scrambled output data not including the data sequence that is associated with receiver malfunction.

Example 13 includes one or more examples, wherein the network interface device performs the first and second scrambling operations at least partially in parallel.

Example 14 includes one or more examples, wherein the data sequence that is associated with receiver malfunction comprises a string of repeated values.

Example 15 includes one or more examples, and including instructions stored thereon, that if executed by one or more processors, cause the one or more processors to: cause the network interface device to identify the selected second scrambler used to scramble the input data in at least one packet that includes the scrambled second output data.

Example 16 includes one or more examples, and including instructions stored thereon, that if executed by one or more processors, cause the one or more processors to: cause the network interface device to perform error coding on the scrambled output data.

Example 17 includes one or more examples, and includes a method comprising: in a network interface device: performing a first scrambling operation on input data to generate first scrambled output data; performing a second scrambling operation on the input data to generate second scrambled output data; and selecting the second scrambled input data based on the first scrambled output data including a data sequence that is associated with receiver malfunction and the second scrambled output data not including the data sequence that is associated with receiver malfunction.

Example 18 includes one or more examples, and includes performing the first and second scrambling operations at least partially in parallel.

Example 19 includes one or more examples, wherein the data sequence that is associated with receiver malfunction comprises a string of repeated values.

Example 20 includes one or more examples, and includes identifying the selected second scrambler used to scramble the input data in at least one packet that includes second scrambled output data.

What is claimed is:

1. An apparatus comprising:

a network interface device comprising:

first circuitry to perform a first scrambling operation on input data to generate first scrambled output data;

second circuitry to perform a second scrambling operation on the input data to generate second scrambled output data, wherein the first scrambling operation and the second scrambling operation apply different scrambling operations; and third circuitry to select the second scrambled output data based on the first scrambled output data including a data sequence that is associated with receiver malfunction and the second scrambled output data not including the data sequence that is associated with receiver malfunction.

2. The apparatus of claim 1, wherein the first circuitry and second circuitry are to perform respective first and second scrambling operations at least partially in parallel.

3. The apparatus of claim 1, wherein the data sequence that is associated with receiver malfunction comprises a string of repeated values.

4. The apparatus of claim 1, comprising a fourth circuitry to identify the selected second scrambler used to scramble the input data in at least one packet that includes the second scrambled output data.

5. The apparatus of claim 1, wherein the network interface device comprises a media access control (MAC) circuitry and wherein the MAC circuitry includes the first circuitry and the second circuitry.

6. The apparatus of claim 1, wherein the network interface device comprises a processor to perform error coding on the selected scrambled second output data.

7. The apparatus of claim 1, wherein the first scrambling operation and the second scrambling operation provide different scrambled output data.

8. The apparatus of claim 1, wherein the first scrambling operation comprises an additive scrambling operation and the second scrambling operation comprises an asynchronous scrambling operation.

9. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), data processing unit (DPU), or network-attached appliance.

10. The apparatus of claim 1, comprising a host system server communicatively coupled to the network interface device, wherein the host system server is to generate the input data for transmission.

11. The apparatus of claim 1, comprising a second network interface device, wherein the second network interface device comprises at least one de-scrambler to de-scramble the scrambled output data based on an indicator of selected scrambler.

12. The apparatus of claim 1, wherein the receiver malfunction comprises one or more of: DC imbalancing, loss of Clock-and-Data-Recovery (CDR) lock, or malfunction as part of link establishment.

13. At least one non-transitory computer-readable medium comprising instructions stored thereon, that if executed by one or more processors, cause the one or more processors to:

configure a network interface device to:

perform a first scrambling operation on input data to generate first scrambled output data;

perform a second scrambling operation on the input data to generate second scrambled output data, wherein the first scrambling operation and the second scrambling operation apply different scrambling operations; and select the second scrambled input data based on the first scrambled output data including a data sequence that is associated with receiver malfunction and the second scrambled output data not including the data sequence that is associated with receiver malfunction.

14. The non-transitory computer-readable medium of claim 13, wherein the network interface device performs the first and second scrambling operations at least partially in parallel.

15. The non-transitory computer-readable medium of claim 13, wherein the data sequence that is associated with receiver malfunction comprises a string of repeated values.

16. The non-transitory computer-readable medium of claim 13, comprising instructions stored thereon, that if executed by one or more processors, cause the one or more processors to:

cause the network interface device to identify the selected second scrambler used to scramble the input data in at least one packet that includes the scrambled second output data.

17. The non-transitory computer-readable medium of claim 13, comprising instructions stored thereon, that if executed by one or more processors, cause the one or more processors to:

cause the network interface device to perform error coding on the scrambled output data.

18. A method comprising:

in a network interface device:

performing a first scrambling operation on input data to generate first scrambled output data;

performing a second scrambling operation on the input data to generate second scrambled output data, wherein the first scrambling operation and the second scrambling operation apply different scrambling operations; and selecting the second scrambled input data based on the first scrambled output data including a data sequence that is associated with receiver malfunction and the second scrambled output data not including the data sequence that is associated with receiver malfunction.

19. The method of claim 18, comprising performing the first and second scrambling operations at least partially in parallel.

20. The method of claim 18, wherein the data sequence that is associated with receiver malfunction comprises a string of repeated values.

21. The method of claim 18, comprising:

identifying the selected second scrambler used to scramble the input data in at least one packet that includes second scrambled output data.

* * * * *